Nov. 3, 1936.   J. F. McKEAGE   2,059,595
MEAT CUTTING MACHINE
Filed March 26, 1935   2 Sheets-Sheet 1

INVENTOR
John F. McKeage,
BY
George D. Richards
ATTORNEY

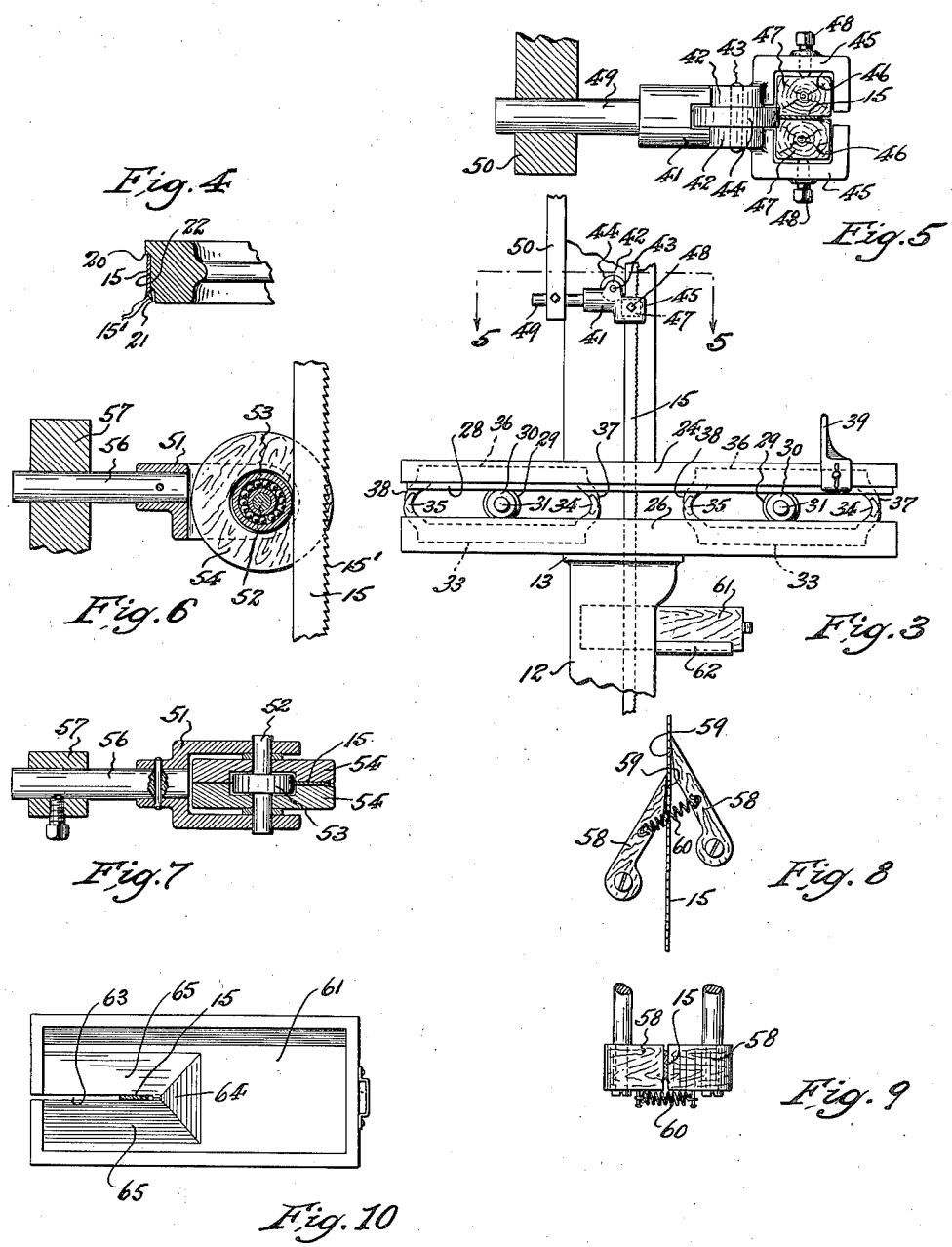

Patented Nov. 3, 1936

2,059,595

UNITED STATES PATENT OFFICE 2,059,595

MEAT CUTTING MACHINE

John F. McKeage, Montrose, Pa., assignor to McKeage Machinery Co., Montrose, Pa., a corporation of Pennsylvania Application March 26, 1935, Serial No. 13,018

2 Claims. (Cl. 143—162)

This invention relates to improvements in meat cutting machines; and the invention has reference, more particularly, to an improved meat cutting machine of the band-saw type.

This invention has for its principal object to generally improve the aforesaid band-saw type of meat cutting machines; and to this end to provide improved means for supporting and driving the band-saw cutting element of the machine in such manner that dulling of the saw blade is guarded against; that novel and efficient means are provided for keeping the saw-blade of the machine clean and free from accumulations of grease, meat particles, bone-dust, etc.; that novel and efficient means are provided for guiding and supporting the saw-blade during cutting operations; that novel and convenient means are provided for collecting refuse, such as meat particles, bone dust, etc., which is accumulated during the cutting operations; and that efficient and smoothly functioning means comprising a novel movable table arrangement is provided for supporting the meat undergoing cutting operations.

Other objects of this invention, not at this time more particularly enumerated, will be understood from the following detailed description of the same.

An illustrative embodiment of this invention is shown in the accompanying drawings, in which:—

Fig. 3 is a fragmentary front elevation of the machine showing the movable feed table arrangement therefor.

Fig. 4 is a fragmentary sectional view showing the novel peripheral formation of the band-saw supporting wheels of the machine.

Fig. 5 is a horizontal section, taken on line 5—5 in Fig. 3, drawn on an enlarged scale, and showing the upper guide means for the band-saw of the machine.

Fig. 6 is an enlarged vertical sectional view of the lower guide means for the band-saw of the machine, and Fig. 7 is a horizontal sectional view thereof.

Fig. 8 is an enlarged front elevational view of the novel means for cleaning the band-saw of the machine, and Fig. 9 is a top end view of the same.

Fig. 10 is a detail plan view of the refuse collector of the machine.

Similar characters of reference are employed in the herein-above described views, to indicate corresponding parts.

Figures 1, 2:
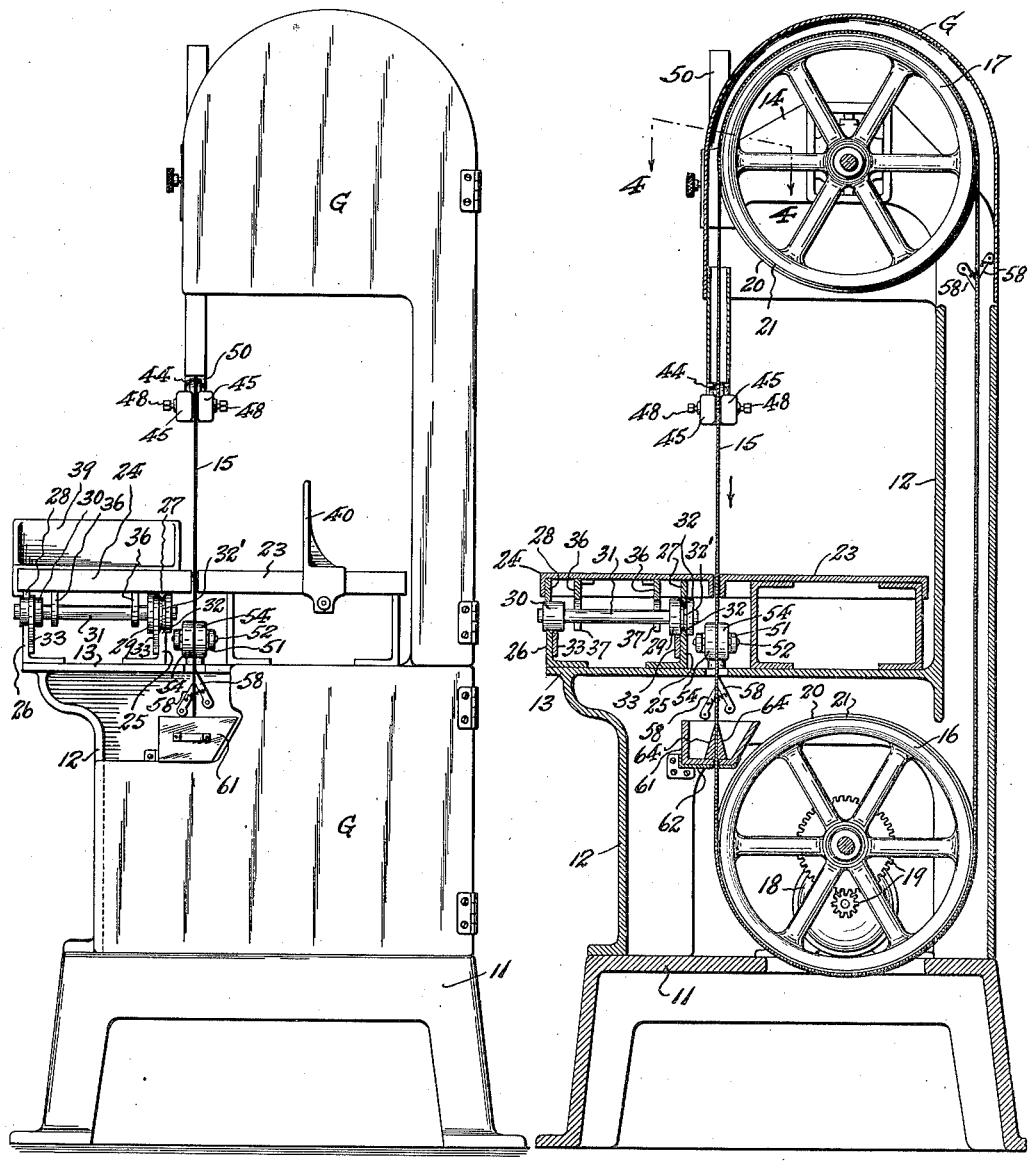
Fig. 1 is a side elevation of a meat cutting machine according to this invention.
Fig. 2 is a vertical longitudinal section through the same.

Referring to the drawings, the improved meat cutting machine according to this invention, comprises a base 11 upon which is supported an upstanding frame 12 having a forwardly projecting bracket extension 13 and a forwardly projecting bearing bracket 14 spaced thereabove in overhanging relation thereto. An endless band-saw 15, having a suitable toothed edge, is supported by and runs vertically between a pair of pulley wheels, comprising a lower wheel 16 and an upper wheel 17. The lower wheel 16 is suitably mounted beneath the bracket extension 13, and is preferably driven by an electric motor 18 through suitable reduction gearing 19. The upper wheel 17 is suitably mounted in connection with the bearing bracket 14 for vertical adjustment, whereby running tension of the band-saw 15 may be regulated as required. The peripheries of the wheels are formed in such novel manner as to provide proper and adequate support to the band-saw 15 without undue friction on the one hand or tendency to slippage on the other, while at the same time the band-saw is so supported against back pressure, consequent upon cutting operations, that any tendency to escape off the wheels is forestalled; furthermore clearance is provided for the teeth 15' of the band-saw as the latter contacts with the wheel surfaces, whereby the set of the teeth is not disturbed or dulling effects exercised upon the teeth. To these ends each wheel is provided at the rear side of its periphery with an outwardly stepped annular shoulder 20, which engages the rear edge of the band-saw so as to prevent lateral displacement of the latter from the wheel faces, especially when the band-saw is subjected to lateral pressure or thrusts consequent upon cutting operations; and, furthermore, each wheel is provided at the forward side of its periphery with an inwardly stepped or countersunk shoulder 21, which underlies the toothed edge portions of the band-saw, so as to provide clearance therefor, and thus prevent the face of the wheel from engaging the teeth 15' with tendency to flatten out the "set" of the teeth and thus dull the band-saw. The peripheral or circumferential surface of the wheel-face, intermediate the stop shoulder 20 and the clearance shoulder 21, is ground flat, i. e. without crown, thus constituting a transversely straight bearing surface 22 for firmly and flatly contacting with the main body of the band-saw, thus assuring adequate running support for the band-saw with a minimum tendency to slippage and yet without giving rise to undue friction. It is essential to efficient cutting effect by the band-saw that the teeth 15' thereof possess the proper degree of "set" and that this "set" condition be retained. Such desired "set", regardless of the quality of the steel from which the band-saw is made, is soon eliminated if the teeth are allowed to run directly in contact with the supporting wheel faces. Due to the provision of the clearance space formed by the countersunk shoulder 21 in peripheral faces of the wheels, it is impossible that the teeth 15' contact with the latter, and consequently the desired "set" of the teeth is not disturbed. This is important, since if the band-saw teeth lack proper "set" the saw body not only tends to heat and thereby cause discoloration of the meat being cut, but also the cutting efficiency of the saw is so reduced that the desired clean knife-like cut is not attained.

Suitably supported, in a fixed position, upon the bracket extension 13, back of and closely adjacent to the descending or operative course of the band-saw 15, is a stationary table or platform 23 disposed horizontally and extending transversely of the frame work. Also supported from the bracket extension 13, in front of and closely adjacent to the descending or operative course of the band-saw 15, is a movable feed table or platform 24, which is likewise disposed horizontally and transversely but so as to be immovable transversely relative to the operative course of the band-saw, so that meat to be cut may be deposited on the table surface and movement then imparted to the table to carry the meat in contact with the operative course of the band-saw for production of desired cutting effects upon the meat. The means for mounting the movable table or platform 24 comprises a pair of transverse stationary track flanges affixed to the bracket extension 13 to extend transversely of the latter. These track flanges comprise an inner track flange 25 and an outer track flange 26. Correspondingly track flanges 27 and 28 are provided in connection with and affixed to the underside of the movable table or platform 24 in opposition to the stationary track flanges 25 and 26. Freely movable supporting roller means are provided to underlie the movable table or platform adjacent to its respective end portions. Each roller means comprises a pair of roller elements 29 and 30 affixed to a carrying shaft or axle member 31. The inner roller elements 29 ride on the inner stationary track flange 25 and are engaged by the inner track flange 27 of the table or platform, while the outer roller elements 30 ride on the outer stationary track flange 26 and are engaged by the outer track flange 28 of the table or platform. In order to prevent lateral displacement of the roller means relative to the stationary track flanges and similar relative displacement of the table or platform 24 relative to the roller means, at least one set of the track flanges, i. e. the inner set, are provided with inverted V-shaped traction surfaces 32, and the inner roller elements 29 are provided with V-shaped traction treads 32' to fit said V-shaped traction surfaces 32. In order to limit the reciprocatory movements of the table or platform 24 relative to the operative course of the band-saw 15, stop means are provided to engage the roller means with arresting effect. To arrest the movement of the roller means relative to and upon the stationary track-flanges, stop plates 33 are affixed to one of the stationary track-flanges, e. g. the outer track flange 26. These stop plates are provided at their extremities with upturned and preferably curvilinear stop horns or projections 34—35, one to engage the roller elements 30 to limit the movement thereof in one direction to the stationary track flanges, and the other to limit the movement of said roller elements 30 on said stationary track flanges in the opposite direction. To arrest the movement of the table or platform upon and relative to the roller means, similar stop plates 36 are affixed to project from the underside of said table or platform, the same having at their ends downturned and preferably curvilinear stop horns or projections 37—38, respectively engageable with the shaft or axle members 31 of the roller means at the respective limits of movement thereof in opposite directions. This mounting of the movable table or platform 24 assures an easy and substantially frictionless movement thereof, without tendency to vibration or lateral displacement, thus assuring clean, even and accurate cutting operations without waste. If desired adjustable backing plate means 39 may be provided in connection with the movable table or platform 24, and an adjustable gauge plate 40 in connection with the stationary table or platform 23.

Means are provided for guiding the operative running or descending course of the band-saw 15, while at the same time firmly supporting or backing the same, with a minimum of friction, in opposition to the thrust of the meat being cut by the cutting edge thereof. The guiding means for this purpose comprises an upper guide means spaced above the tables or platforms 23—24 and a lower guide means arranged beneath the latter.

The upper guide means comprises a bifurcate guide-body 41 provided at opposite sides of its bifurcation with upstanding bearing ears 42 to support a transverse axle pin 43 upon which is mounted, within the bifurcation of the guide-body, a thrust-roller 44, which may be of the ball or roller bearing type to reduce rotative friction to a minimum. Extending forwardly from the forward end of said bifurcate guide-body, in outwardly and preferably downwardly offset relation to the thrust-roller 44 are a pair of opposed bracket arms 45, having cavities or sockets 46 at their inner sides to receive and support adjustable guide-blocks 47 to bear on opposite side faces of the band-saw course running therebetween. Adjusting screws 48, threaded through the outer walls of said bracket arms, serve to adjustably hold the guide-blocks 47 in contact with the faces of the band-saw 15. A tail-stock 49 projects rearwardly from the guide-body 41 and is affixed to a vertically adjustable carrier bar 50 dependent from the bearing bracket 14 of the frame-work, to render adjustable the spaced relation of the upper guide means relative to the underlying tables or platforms 23—24. When this upper guide means is operatively related to the descending operative course of the band-saw 15, the body of the latter passes between the guide-blocks 47, with its back edge opposed to the thrust-roller 44. The guide-blocks 47 are preferably made of wood (e. g. hard maple) and bear with a minimum of friction respectively against opposite sides faces of the band-saw, thereby holding the operative course of the latter firmly against lateral play, and thus keeping the same in a straight and true running course. When the band-saw runs idly, that is when not performing a cutting operation, the back edge thereof is free or substantially free from contact with the thrust-roller 44, but when a cut is being made, the thrust of the meat against the cutting edge of the band-saw tends to force the saw back, whereby the running back edge thereof is moved into stopped engagement with said thrust-roller 44, whereupon the latter holds the same true to its operative running course with a minimum of friction.

The lower guide means is of a somewhat different construction so that in addition to its guiding effect upon the band-saw it also provides for a cleaning effect thereupon. The lower guide means comprises a bifurcate guide-body 51, supported by and between the arms of which is an axle pin 52 upon which is mounted a thrust-roller 53, preferably of the ball or roller bearing type to reduce rotative friction to a minimum. Also rotatively mounted on said axle pin 52 on opposite sides of said thrust-roller 53 are guide disks 54 of a diameter exceeding the diameter of said thrust-roller so that the marginal portions thereof extend beyond the circumferential face of the latter. At their inner faces, said guide disks 54 are provided with chambers 55 which envelop said thrust-roller. The said guide disks 54 are preferably made of wood (e. g. hard maple) although the same may be made of any other suitable material. Connected with said guide-body 51 is a tail-stock 56, which is adjustably connected, in any suitable manner, with a convenient support, such e. g. as a fixed post 57, to thereby hold the lower guide means in operative relation to the descending operative course of the band-saw 15. When said lower guide means is operatively related to the band-saw, the body of the latter passes between the opposed inner faces of the guide disks 54, which contact with the opposite faces of the band-saw, while the rear edge of the latter is opposed to the thrust-roller 53, the guide disks 54 bearing against the sides of the band-saw hold the operative course of the latter against lateral play, thereby further assisting in keeping the same in a straight and true running course. When the band saw runs idly, the back edge thereof is substantially free from contact with the thrust-roller 53, but when a cut is being made, the thrust of the meat against the cutting edge of the saw tends to force back the saw, whereby the running back edge thereof is moved into stopped engagement with said thrust-roller 53, whereupon the latter holds the saw true to its operative running course with a minimum of friction. In addition to the guiding effect of the guide-disks 54, the latter, by reason of their tendency to rotate under the moving contact of the saw body therewith not only reduce friction, but also serve to wipe the faces of the saw body with a cleaning effect thereupon. It will be obvious that the described form of lower guide means may also be used for the upper guide means in place of the type of upper guide means above described.

In order to effect a thorough cleaning of the band-saw, following cutting operations therewith, novel cleaning means is provided, which may be arranged to cooperate with the band-saw at convenient points. Each cleaning means comprises a pair of pivoted pivotally mounted doctor-blades 58 between the free ends of which the band-saw passes. These doctor-blades 58 are preferably made of wood (e. g. locust), and are so disposed that their free end portions converge upon the blade sides at acute angles. The free ends of the doctor-blades 58 are preferably transversely beveled, as at 59, to contact the band-saw faces with their outer sides inclined away therefrom. Since the doctor-blades 58 are arranged so that the movement of the band-saw is toward the free ends thereof, the latter operate with a doctoring or shearing effect upon the band-saw faces, thus separating and discharging away from the latter any adhering particles of flesh, grease, bone, etc. Preferably the saw contacting ends of the opposed doctor-blades are somewhat vertically offset in relation to each other so as to not wholly close therebetween the spaces intermediate the saw teeth. Suitable means are provided for yieldably pressing the doctor-blades against the band-saw faces. Illustrative of one satisfactory means for this purpose, the drawings show a pull spring 60 interconnected between opposed doctor-blades. Due to the "set" and consequent impact of the saw teeth 15' against the ends of the doctor-blades, as resiliently pressed toward the band-saw by the spring means 60, the ends of the doctor-blades tend to vibrate with a tapping effect upon the band-saw body which operates to dislodge and throw out of the gullets between the teeth any accumulations of flesh, and bone particles lodged therein, and therefore not only the side surfaces of the band-saw are maintained bright and clean, but the teeth per se are likewise cleansed. Due to the arrangement whereby the doctor-blades are resiliently pressed against the band-saw, the same are self-compensating with respect to wear, and consequently function efficiently over a long period of useful life.

Means are provided below the cutting point of the machine and in association with the operative course of the band-saw, preferably below a set of the cleansing doctor-blades, for collecting the refuse material removed from the said band-saw. This means may be variously constructed and arranged. Illustrative of one satisfactory arrangement thereof, the same comprises a collection box or tray 61 removably supported by a bracket or slideway means 62 in connection with the bracket extension 13 of the machine frame-work. The inner end portion of this box or tray 61 is provided with an entering longitudinal slot 63 sufficiently wide to pass the band-saw 15, whereby the box or tray may be caused to straddle the descending course of the latter so that it passes downwardly through the interior thereof. This arrangement permits the easy removal and replacement of the box or tray when it is desired to empty the same of its accumulation of waste. Preferably the interior of the box or tray contiguous to the band-saw passage slot 63 is provided with deflector means 64 having sides 65 inclining away from the band-saw sides into the interior of the box or tray, the same tending to deflect waste material discharged from the band-saw away from the surfaces of the latter for deposit within the box or tray interior.

The band saw and driving means therefore may be suitably enclosed in guards G as shown in Fig. 1, so that only the working section of the saw adjacent to the feed table or platform is exposed.

Having now pointed out the various novel features and improvements entering into the novel construction of meat cutting machine according to this invention, I claim:—

1. In a meat cutting machine of the band-saw type, the combination with the effective course of the saw thereof of a guide means comprising a bifurcate guide-body, an axle pin supported by and across said guide-body, a thrust roller rotatable on said axle pin with which the back edge of the saw is engageable, a pair of guide disks mounted for free rotation on said axle pin respectively at opposite sides of said thrust-roller with their side face portions respectively engaging opposite sides of the saw passing therebetween with wiping effect.

2. In a meat cutting machine of the band-saw type, the combination with the effective course of the saw thereof of a guide means comprising a bifurcate guide-body, an axle pin supported by and across said guide-body, a thrust-roller rotatable on said axle pin with which the back edge of the saw is engageable, a pair of guide-disks also rotatable on said axle pin respectively on opposite sides of said thrust-roller, and said guide-disks exceeding in diameter said thrust-roller and having cavities in their sides to envelop the latter, whereby the inner faces of the same engage opposite sides of the saw passing therebetween with both guiding and wiping effect.

JOHN F. McKEAGE.